March 28, 1939. G. A. BIASCO 2,152,459
VENT PIPE FOR STORAGE TANKS
Filed Jan. 15, 1937
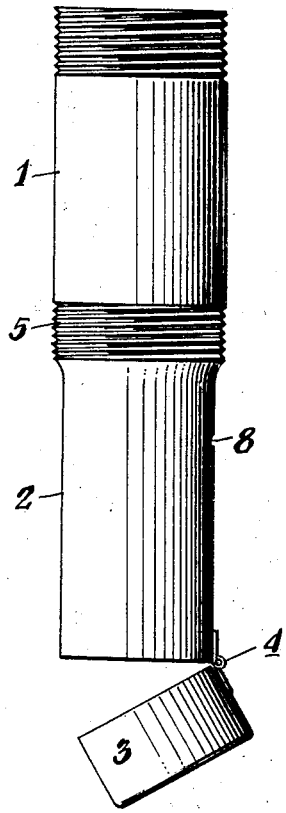
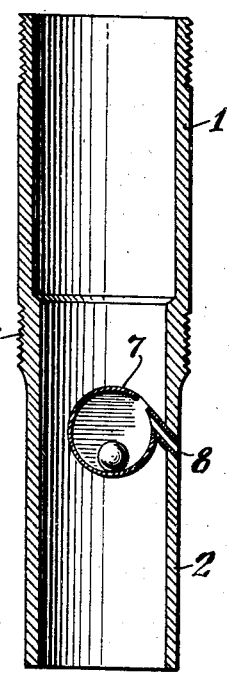
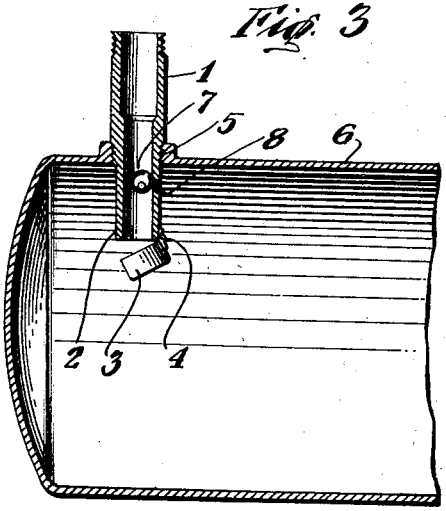
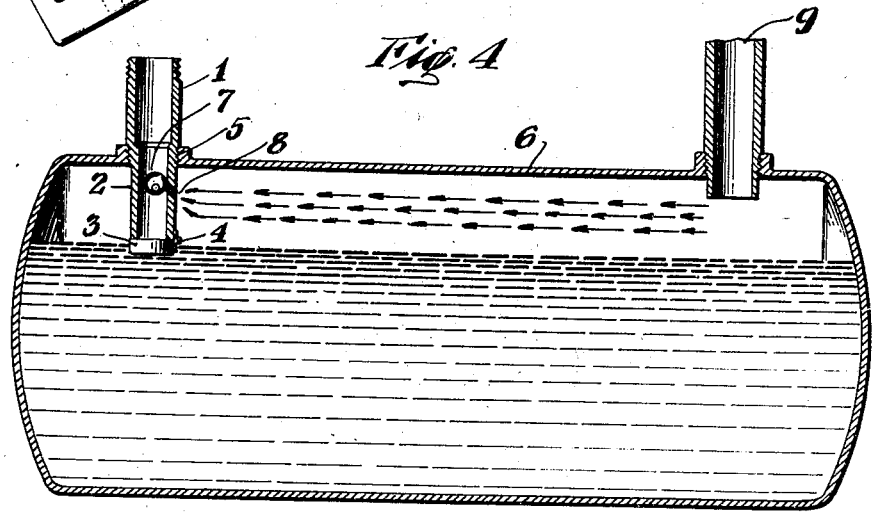
INVENTOR
George Arthur Biasco
BY
ATTORNEY Patented Mar. 28, 1939

2,152,459

UNITED STATES PATENT OFFICE 2,152,459

VENT PIPE FOR STORAGE TANKS

George Arthur Biasco, New York, N. Y.

Application January 15, 1937, Serial No. 120,757

1 Claim. (Cl. 116—110)

This invention relates to vent pipes for storage tanks for fluids and while it contemplates more especially storage tanks for fuels, it will be understood from the following description that it is applicable to other storage tanks of various kinds wherein somewhat similar conditions are to be found.

It is the usual practice to bury storage tanks for fuel oils in the ground, said tanks being provided with fuel intakes and vent pipes, the latter being designed to permit a free displacement of the air from said tank as the fuel oil is supplied thereto through the intake openings. In the filling of fuel tanks provided with vent pipes of present well-known construction, it not infrequently happens that due to inattention or preoccupation with other matters on the part of the operator, the tanks overflow before the supply is cut off thus producing unsightly and odoriferous conditions in the overlying grounds, damaging lawns, shrubbery and trees, and destroying the fertility of the soil.

It is the object of this invention to provide a simple and improved construction for vent pipes to be used on storage tanks of the character referred to whereby these undesirable results can be avoided and the tanks filled to a predetermined level without requiring the close attention of the operator in charge.

Specific details of a preferred embodiment of my invention are exemplified in the drawing which shows a common type of fuel tank employed for the storage of fuel oil.

In the drawing,

Fig. 1 is a side elevation of one embodiment of the invention removed from the oil tank;

Fig. 2 is an axial section of the same;

Fig. 3 is a vertical section, on a reduced scale, of one end of a fuel tank in which the improved vent pipe has been installed; and Fig. 4 is a vertical section of the fuel tank complete.

According to the embodiment of my invention shown in the drawing, the vent pipe comprises an upper portion 1, a lower portion 2 of slightly smaller diameter than the upper portion, and a combined float and valve member 3 which is hinged at 4 to the lower or inner end of the vent tube. Said vent pipe is provided with external screw threads 5 to permit it to be threaded into a vent pipe opening which is usually provided in the top wall of the tank or drum. As shown in Fig. 4, the vent pipe is open at its upper and lower ends to permit the free expulsion of air therethrough during the filling operation which takes place through an intake 9. The construction and arrangement of the combined float and valve member 3 is such that as the fluid in tank 6 rises above a certain level, the member 3 is displaced upwardly until the valve member is pressed into sealing engagement with the main vent opening at the bottom end of lower portion 2 of the vent pipe. For the purpose of calling attention to the fact that the storage tank is nearly full, suitable means for signaling are provided which will be responsive to a rising pressure in the tank due to the closure of the main vent opening in the lower portion of the vent pipe. In the present instance, signaling means in the form of an audible signal or whistle 7 are arranged in the lower portion of the vent pipe between the main opening at the bottom and the threaded portion 5, the whistle being suitably disposed to be sounded by the outward rush of the trapped air in the tank through an auxiliary vent opening 8.

It will be understood from the foregoing description that due to the restricted size of auxiliary vent opening 8, a rising pressure of the air in the confined space above the fluid surface, produces a whistling signal of growing intensity which may be utilized by the attendant for a determination of the proper time at which the supply is to be cut off at the discharge valve on the tank car from which these storage tanks are usually replenished. It will be understood furthermore that if, for any reason, the operator fails to shut off the discharge valve, the continued rise of pressure will either cause a stoppage of the pump on the tank car or at the worst, reduce the inflow of oil to such an extent as to greatly prolong the interval of time intervening between the sounding of the whistle and the overflow of oil at the top of the vent pipe. It will be seen furthermore that if, for any reason, the level of oil in the tank reaches auxiliary vent opening 8, the arrangement of the audible alarm within and relatively far down in vent pipe 1 will cause any oil which may be discharged through the signal 7 to be confined within the vent pipe and thus avoid damage to the surrounding lawn or grounds.

I claim:

In combination with a storage tank, for liquids under pressure, having an intake pipe; of a vent pipe, open at both ends, having an upwardly extending portion exteriorly of the tank and a downwardly extending portion interiorly of the tank, said downwardly extending portion having at a point above its lower end an opening into the tank of lesser area than the diameter of said downwardly extending portion, which opening establishes communication between the tank and said vent pipe, a valve actuated by the rise of liquid in said tank to thereby close the lower end of the downwardly extending portion; and an audible signaling device, located in said downwardly extending portion adjacent said opening, to first sound an audible signal, after said valve is closed by the liquid, by reason of gas escaping from the tank through the opening to the vent pipe, and then to become submerged and silenced by the accumulation of a body of liquid in said vent pipe after the rising liquid in the tank enters the opening aforesaid.

GEORGE ARTHUR BIASCO.